June 28, 1955 C. H. WIKLUND 2,711,602
SLIDE CHANGING MEANS
Filed March 13, 1951 5 Sheets-Sheet 4
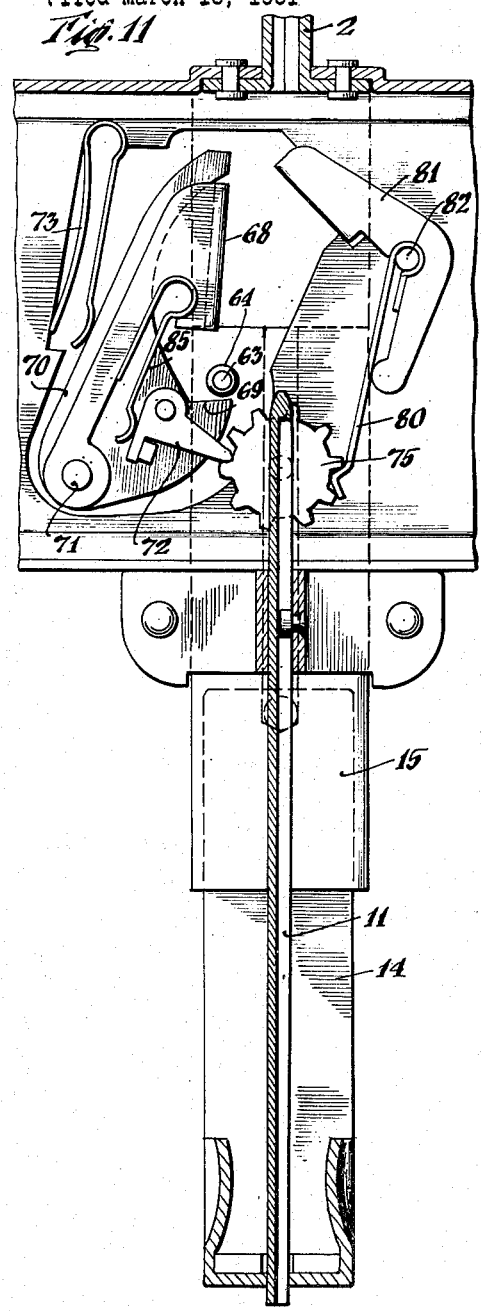
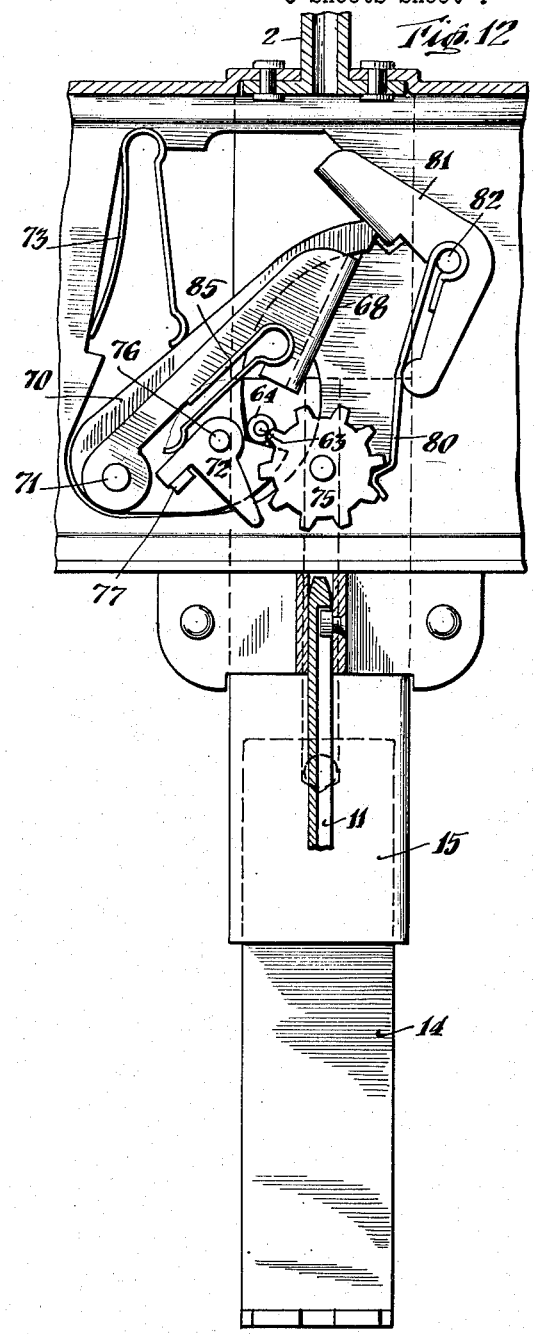
INVENTOR
Carl H. Wiklund
BY
Norman Holland
ATTORNEY June 28, 1955 C. H. WIKLUND 2,711,602
SLIDE CHANGING MEANS
Filed March 13, 1951 5 Sheets-Sheet 5
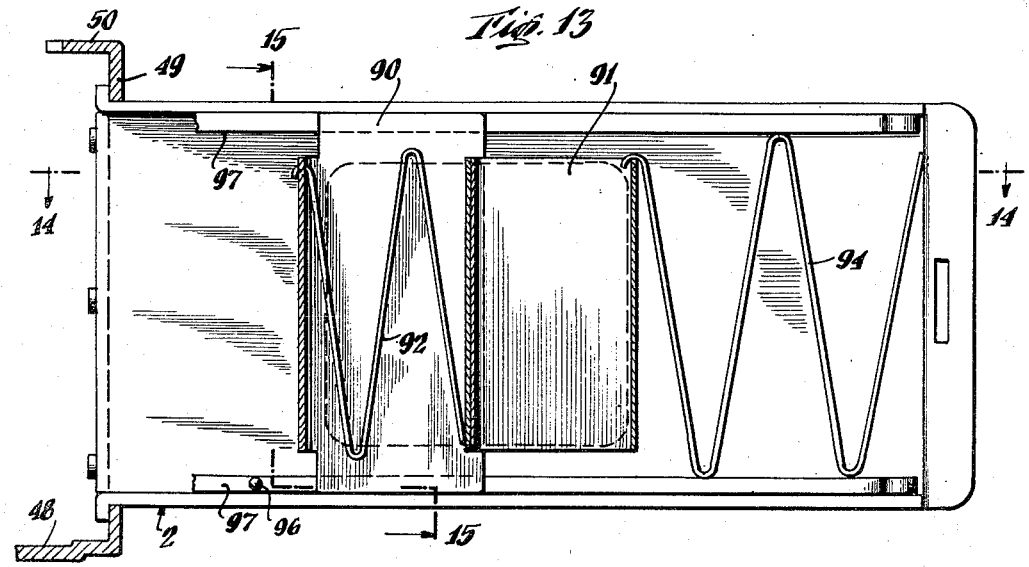
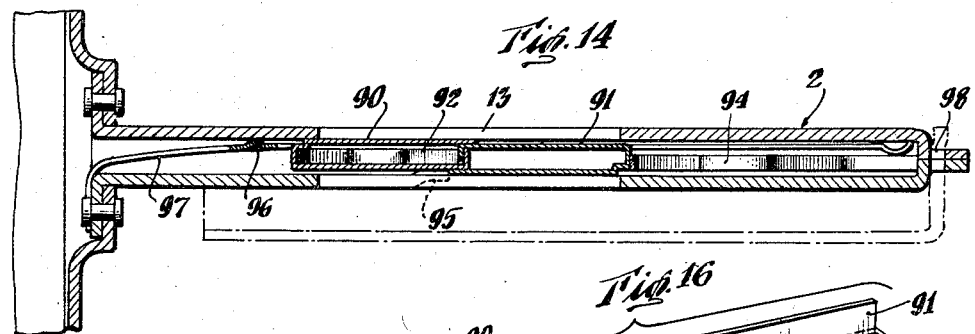
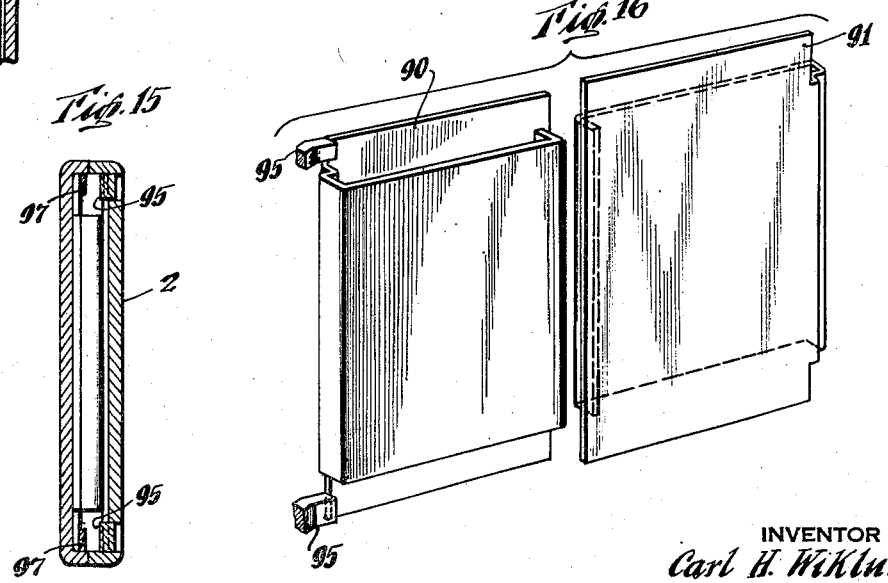
INVENTOR
Carl H. Wiklund
BY
ATTORNEY United States Patent Office 2,711,602
Patented June 28, 1955

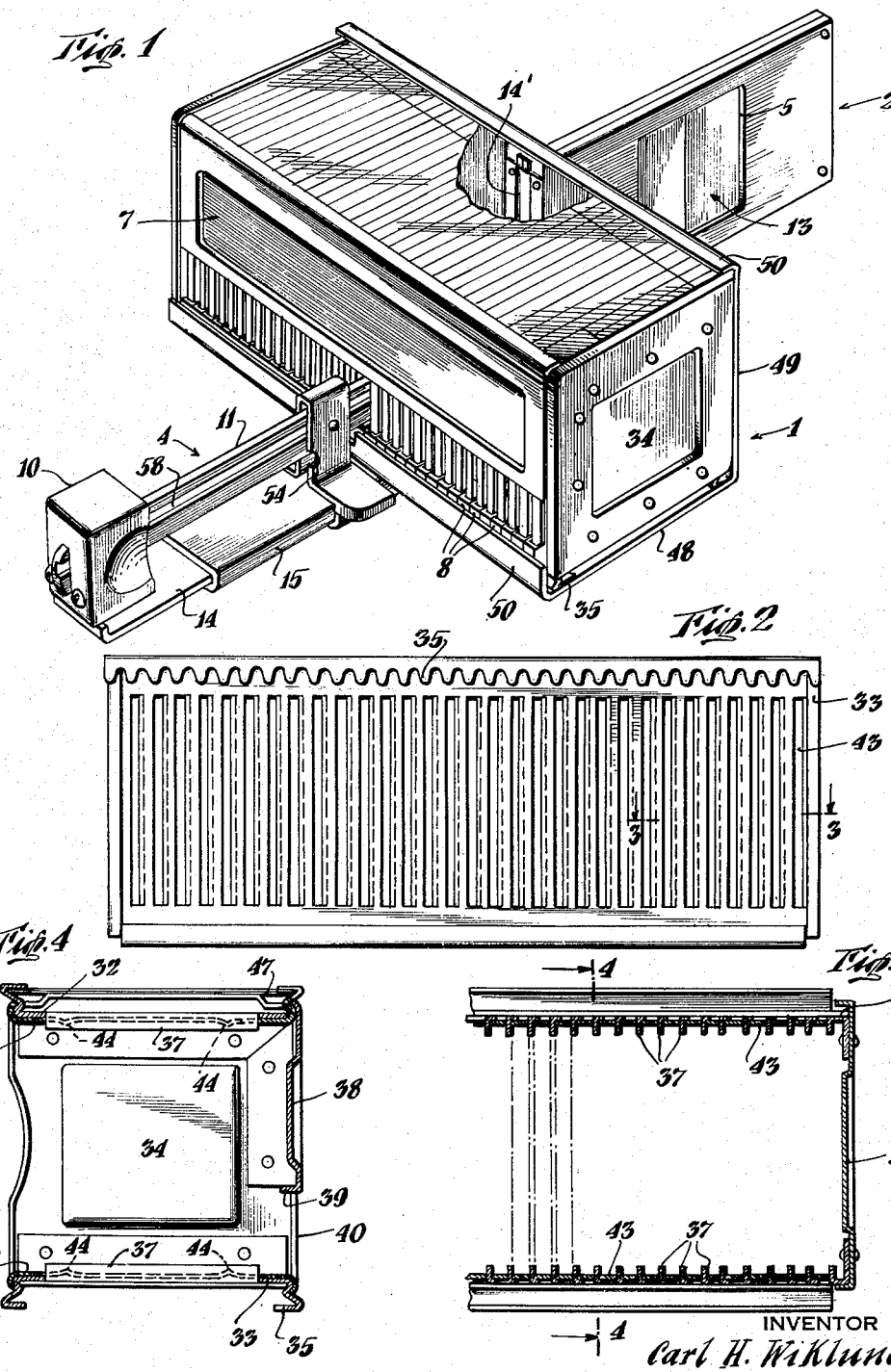

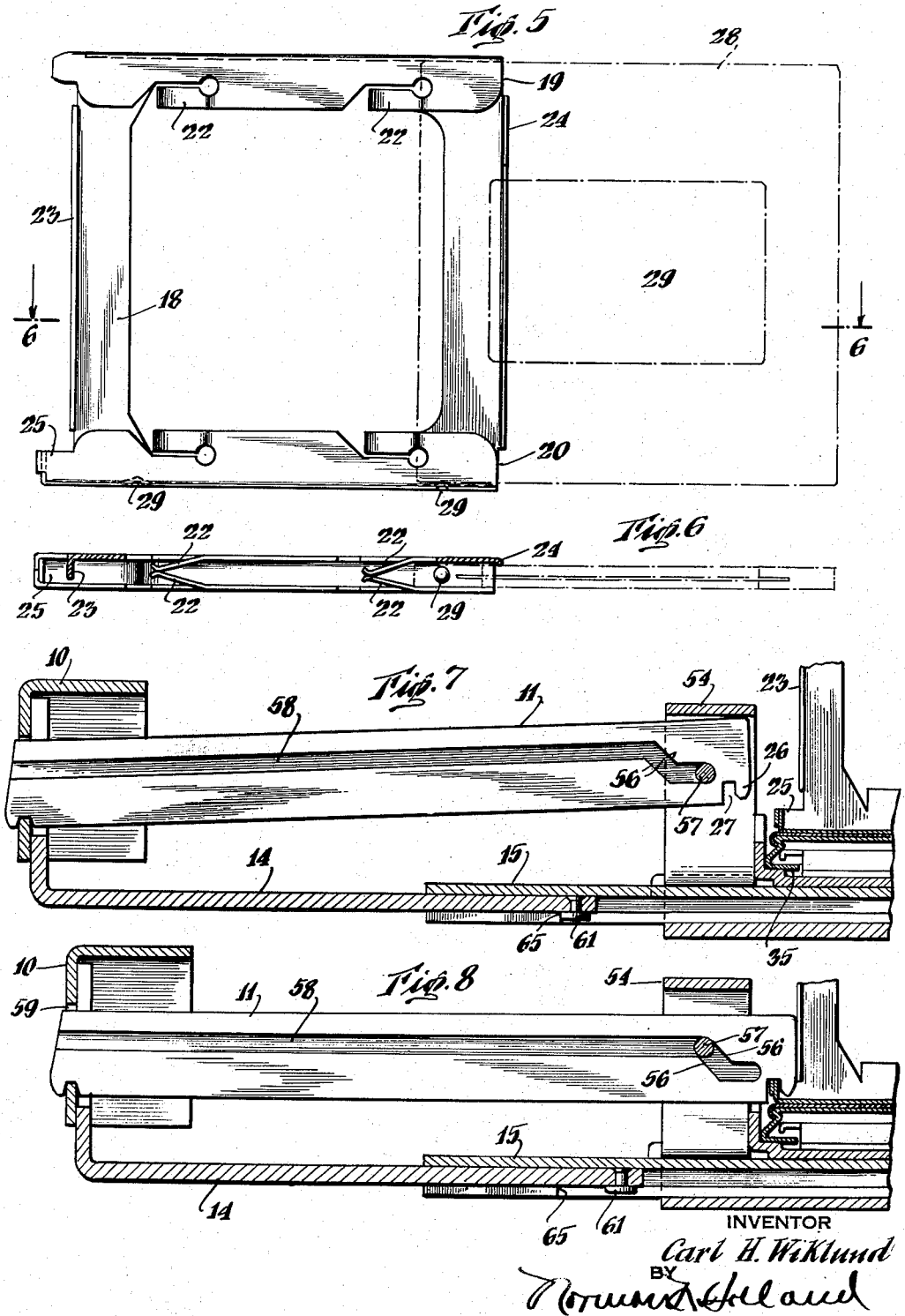

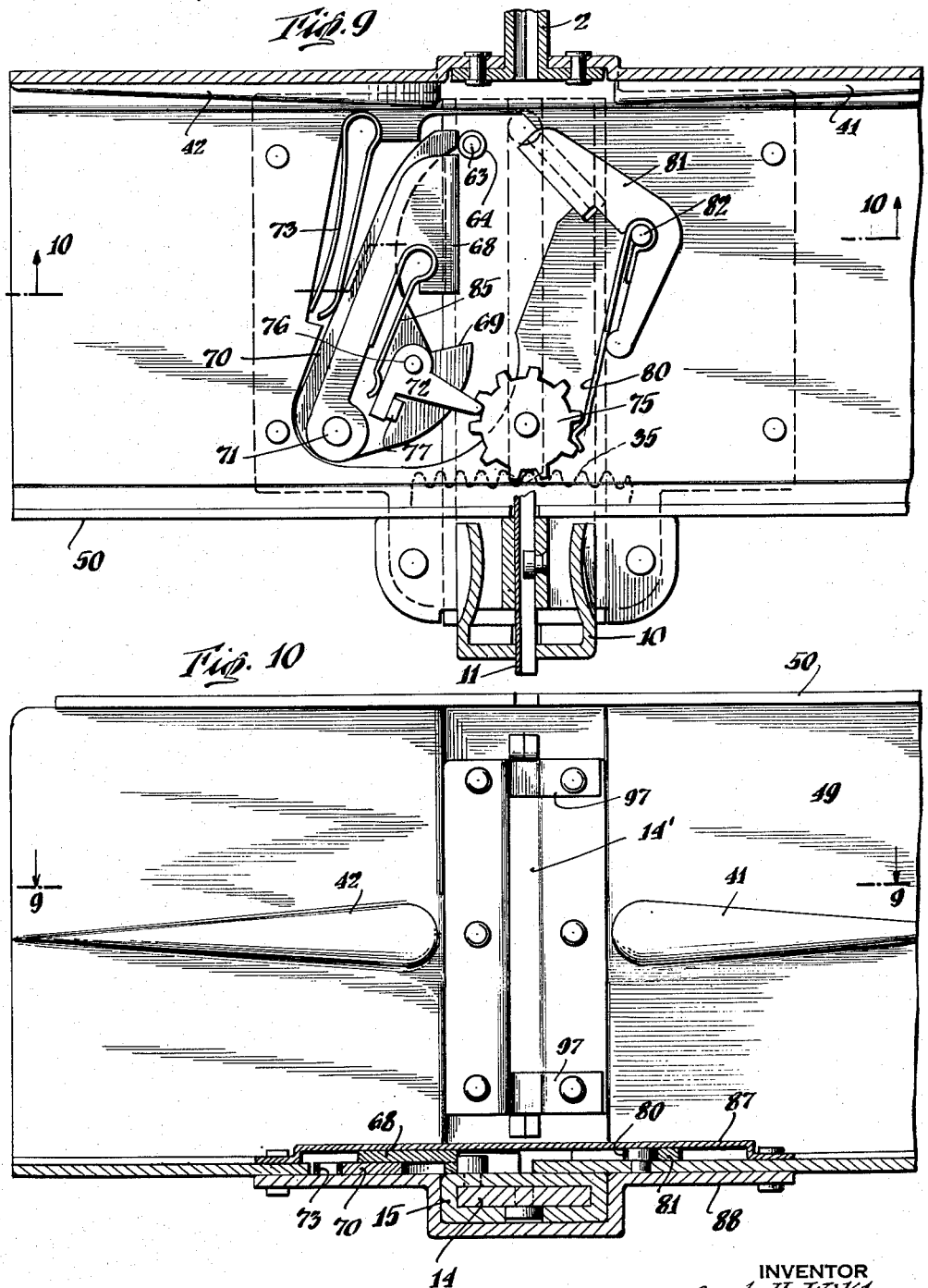

2,711,602

SLIDE CHANGING MEANS

Carl H. Wiklund, Mount Vernon, N. Y., assignor to Airequipt Manufacturing Co., Inc., New Rochelle, N. Y., a corporation of New York Application March 13, 1951, Serial No. 215,371

18 Claims. (Cl. 40—79)

The present invention relates generally to means for exhibiting transparent slides, and more particularly to means for moving such slides out of a magazine to viewing positioning, for thereafter returning them to the magazine, and for automatically advancing the magazine to present another slide.

Transparent slides are generally exhibited by aligning them with the optical system of a projector so as to throw a representation of the slide on a screen. It is a tedious operation to manually remove the slides from a box, place them in alignment with an optical system, and thereafter remove them from a projector and replace them in the box. In addition, the slides frequently become mixed up during replacement into the box, which requires sorting and replacing them in correct position for subsequent use.

It has been attempted to overcome difficulties such as the above by the use of slide changing devices which remove the slides singly from a group for viewing and thereafter return them to the group or form them into a second group. Such previous devices have been objectionable for various reasons. Some have been too cumbersome for practical use, others have been limited to use with special projectors, and still others have been too expensive by reason of their complicated constructions.

The present invention aims to minimize or overcome the above and other difficulties by providing a new and improved device of relatively simple and inexpensive construction and operation for moving slides from a magazine to a viewing position and thereafter returning them to the magazine, and which automatically advances the magazine each time an exhibited slide is returned to the magazine.

An object of the present invention is to provide a new and improved slide changing device.

Another object of the invention is to provide new and improved frame-like holding means for slides.

Another object of the invention is to provide a device embodying a new and improved magazine for containing slides or slide holders.

Another object of the invention is to provide improved means for intermittently advancing a magazine.

Still another object is to provide a slide changing device which embodies improved housing and shutter means.

A still further object of the invention is to provide a slide changing device of relatively simple construction and operation.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 1 is a perspective view showing a preferred embodiment of the present invention;

Fig. 2 is a bottom view of the magazine illustrated in Fig. 1;

Fig. 3 is a fragmentary sectional view taken along line 3—3 of Fig. 2;

Fig. 4 is a sectional view taken along line 4—4 of Fig. 3;

Fig. 5 is an enlarged view of a frame-like slide holder used with the magazine illustrated in Figs. 1 through 4;

Fig. 6 is a sectional view taken along line 6—6 of Fig. 5;

Fig. 7 is an enlarged fragmentary sectional view showing portions of the device for moving slide holders in and out of a magazine and for advancing the magazine;

Fig. 8 is a view similar to Fig. 7 but showing the parts in a different relationship;

Fig. 9 is an enlarged fragmentary view, partly in section, showing the mechanism for advancing a magazine;

Fig. 10 is a sectional view taken along line 10—10 of Fig. 9;

Figs. 11 and 12 are plan views similar to Fig. 9, but showing the parts of the magazine actuating mechanism in different relationships;

Fig. 13 is a vertical sectional view through the housing shown at the right side of Fig. 1;

Fig. 14 is a sectional view taken along line 14—14 of Fig. 13;

Fig. 15 is a sectional view taken along line 15—15 of Fig. 13; and

Fig. 16 is a perspective view showing elements of the shutter illustrated in Figs. 13–15.

Referring more particularly to Fig. 1 there is shown a magazine supporting and guiding means 1 having a housing 2 projecting outwardly from one side thereof and a slide transferring means 4 projecting outwardly from an opposite side thereof. In usage the housing 2 fits into a suitable slot or aperture in a projector (not shown), so that an aperture 5 in the housing aligns with a lens and source of light contained within the projector. Thus when a slide to be viewed is in alignment with the optical system, a representation will be thrown onto a screen (not shown). A magazine 7 mounted on the supporting and guiding means 1 contains a plurality of slides mounted in individual frames or holders 8. When the handle 10 of the slide transferring means is moved toward the magazine, a transfer member 11 engages with a slide holder 8 and moves it out of the magazine 7 into the hollow housing 2. As the holder and its slide move into the housing, shutter means 13 carried by the housing is opened and light passes through the slide. As the transfer member 11 is moved back to an original position clear of the magazine 7 and its supporting means 1, it pulls the holder 8 out of the housing and returns it to its original location in the magazine.

As the transferring member 11 moves toward a fully withdrawn position there is actuated a mechanism, through sliding member 14 and sliding sleeve 15, for advancing the magazine sufficiently to place a succeeding holder 8 in alignment with the housing 2 and transfer member 11. This advancing movement of the magazine occurs at about the time the transfer member 11 moves out of engagement with a holder 8. The mechanism which advances the magazine is carried by the magazine support means 1 and is not shown in Fig. 1 as it is located beneath the magazine. The entire device and its operation will now be described in detail.

As mentioned above, each slide is carried in a frame-like holder 8 and a plurality of these holders are carried by the magazine. One of the holders is shown in detail in Figs. 5 and 6 and comprises a generally planar portion 18 with inwardly facing channels 19 and 20 extending along upper and lower edges thereof. Tabs 22 shown extending inwardly from opposite sides of the channels are adapted to resiliently engage a slide inserted into the channels and accurately position it in the holder, so that when the holder is aligned with the optical system of a projector the film carried by the slide will be in sharp focus. An end of the holder may be turned inwardly to form a stop portion 23 for limiting the extent of movement of the slide into the holder. In addition, the edge 24 of the holder opposite to the stop portion 23 may be turned inwardly slightly so as to minimize the chances of accidental removal of the slide from the holder. One of the holder channels, shown in Figs. 5 and 6 as the bottom channel 20, extends beyond the stop portion 23 and forms a recess 25 for receiving a portion 26 of the transfer member 11 during removal of the holder from the magazine and return to the magazine. The holders 8 may be formed by stamping and bending them from thin sheets of aluminum alloy or similar material.

The holders are adapted to contain any type of slide; for purposes of convenience and illustration a well known type of slide is shown in Figs. 5 and 6 about to be inserted into a holder. The particular slide illustrated comprises apertured cardboard portions 28 holding a section of film 29 in alignment with the aperture through the cardboard. The cardboard and its retained film may be inserted into the open end of the holder and pushed into it until its edge abuts against the stop portion 23. The slide may comprise a pair of glass plates with the film between them. Regardless of the type or thickness of the slide the tabs 22 of the respective holders serve to locate the slide films in similar positions in the holders. Since each holder is accurately located in the same viewing position when in the housing 2, each film will be in sharp focus. To facilitate retaining the holder in a magazine, as will be later described, the holder is shown provided with indentations 29 at the bottom of one of its channels. These engage with projections of the magazine and minimize unintentional removal from the magazine.

The magazine 7 for containing the holder is a generally box-like structure comprising top and bottom members 32 and 33, respectively, secured to end members 34. The bottom member is provided with a rack 35 extending along the length of the magazine and adapted to engage with a gear of the advancing mechanism to be later described. Each of the top and bottom members 32, 33 carries transversely extending inwardly projection portions 37 for dividing the interior of the magazine into a plurality of separate divisions, each division being adapted to receive a single slide holder 8. These transversely extending portions 37 may be formed by striking inwardly portions of the top and bottom members. One side of the magazine is completely open for receiving the slide holder and the other is partially closed by a connecting member 38 which has an inwardly extending portion 39 serving as a stop to accurately slide the holders in alignment with each other upon their insertion into the magazine. The opening 40 thus provided beneath the connecting side member 38 permits insertion of the transfer member 11 into the magazine for removal and return of slide holders.

Preferably each top and bottom member of the magazine carries a spring plate 43, each plate being formed with transversely extending slots for receiving the inwardly extending projections 37 of the top and bottom members; intermediate each of the inwardly extending projections 37 the spring plates are bowed or struck inwardly to provide surfaces 44 for frictionally engaging upper and lower edges of the slide holders, and for fitting into indentations 29 of the holders. While Fig. 4 shows each of the spring plates provided with a pair of inwardly struck portions 44 preferably those adjacent the open edge of the magazine are omitted as this facilitates insertion of the holders into the magazaine, the inwardly disposed portions 44 being sufficient to retain the holders securely in position.

Any number of spaces or divisions may be provided by the inwardly extending projections 37 of the magazine, but about thirty-six has been found a convenient number as this gives a convenient size of magazine. The number of teeth in the rack 35 which extends along the bottom of the magazine is preferably such that when the rack is advanced one tooth, the magazine is advanced a distance sufficient to align a succeeding slide holder with the housing 2 and transfer member 11. An index card 47 may be mounted on top of the magazine, the index card being marked off in spaces corresponding to the divisions within the magazine. These spaces may be suitably numbered and identified to readily indicate the subject matter of the particular slide contained within a corresponding inner space of the magazine.

The slide holders may be inserted into the magazine by aligning them with the particular desired space in the magazine and pressing them inwardly, the recesses 25 at the lower edges of the holders being located adjacent the bottom member of the magazine so that they will be located adjacent the transferring member 11, as shown in Fig. 1.

When the transfer member 11 is fully withdrawn, so that it is clear of the magazine support 1, a magazine may be inserted endwise along a base portion 48 of the magazine support and its upwardly extending side wall portion 49. Inwardly extending flange portions 50 on the magazine support and side portions retain the magazine but do not prevent longitudinal movement of the magazine.

Accurate positioning of slide holders 8 in a magazine may be provided by tapering embossments 41, 42 on the side wall 49 of the magazine support. As the magazine moves holders 8 toward housing 2, any holder not fully seated comes into contact with an embossment and is gradually and automatically pushed to correct seated position.

When the magazine is on its supporting means it is automatically positioned by the magazine advancing means, to be later described, so that a slide holder is in alignment with both the housing 2 and the transfer member 11. The transfer member is maintained in alignment with the housing 2 at all times by guide means 54, carried by the magazine support which extends upwardly along opposite sides of the transfer member. Thus, the transfer member is held against movement in the direction of movement of the magazine.

As the transfer member is moved toward the housing, the transfer member moves downwardly until the projection 26 adjacent its end moves into engagement with the recess 25 of the particular slide holder which is in alignment. Continued movement of the transfer member moves the particular holder out of the magazine and into the housing 2. Upon motion of the transfer member in an opposite direction, the holder is withdrawn from the housing and placed back in its particular space in the magazine. Near the end of its withdrawal movement the transfer member is elevated so that its projecting portion 26 moves up out of the holder recess 25. Shortly after the transfer member has moved clear of the holder, the advancing mechanism under the magazine moves the magazine one step forward so that a next succeeding slide holder comes into alignment with the housing and the transfer member.

Lifting and lowering of the transfer member during its reciprocation may be obtained by cam surfaces 56 on the transfer member which cooperate with a stationary stud 57 carried by the transfer member guiding means 54. As the transfer member moves inwardly a cam surface 56 traveling along the stationary stud 57 causes the inner end of the transfer member to move downwardly. As the transfer member is withdrawn a reverse action occurs and the transfer member is lifted so that the projection 26 adjacent its inner end is withdrawn from the recess of a holder. A recess 27 in the transfer member receives adjacent wall portions of the slide holder. The inclined cam surfaces which lift and lower the transfer member may be part of a groove 58 which extends generally lengthwise along the transfer member and into which the stud projects at all times.

The outer end of the transfer member may be rotatably supported in any suitable manner. As shown in Figs. 7 and 8 the outer end extends through an opening 59 in the handle member 10. The handle member 10 is carried by a sliding member 14 which telescopes into a sliding sleeve 15. A retaining stud 61 prevents complete withdrawal of the sliding member from the sleeve.

The sliding member 14 and sliding sleeve 15 located below the transfer member are moved by the handle 10 in the same direction as the transfer member, and operate the magazine advancing or indexing mechanism. When the transfer member is fully inserted so that it extends across the magazine, the underlying sliding member and sliding sleeve are disposed beneath the magazine base portions 48, as indicated in Fig. 9. In this relationship a stud 63 and roller 64 carried by the sliding sleeve are disposed at an innermost position with respect to the housing and magazine support.

As the handle of the slide transferring means is moved away from the magazine to withdraw the transfer member, the lower sliding member 14 is simultaneously withdrawn. The sliding sleeve 15 remains in the position indicated in Fig. 9 until the stud 61 carried by the sliding member 14 comes into contact with a stop portion 65 adjacent an outer end of the sliding sleeve. When this position is reached, the sliding sleeve commences to be withdrawn from below the magazine support and the stud 63 and roller 64 travel along the surface of an adjacent cam lever follower 68 and come into contact with a facing surface 69 of a cam lever 70 which is pivoted for rotation about a stud 71. Continued movement of the sliding sleeve and its roller urges the cam lever 70 in clockwise direction and a pawl 72 carried by the cam lever presses against an adjacent tooth of a gear 75 which normally meshes with the rack 35 at the underside of the magazine. The pawl 72 is rotatably mounted on a pin 76 but is held against rotation at this time by a stop portion 77 on the cam lever 70. Continued withdrawal of the sliding sleeve forces the pawl 72 to turn the gear 75 through a single tooth. As the gear 75 advances through one tooth, the magazine is also advanced a single step, due to the fact that its rack 35 meshes with the gear. A ratchet spring 80 holds the gear against rotation through more than a single tooth and in correct position for engagement by the pawl on a succeeding stroke of the transfer member and sliding sleeve. To insure against rotation of the gear through more than one tooth there is preferably provided a ratchet lever 81 movable about a pin 82. As the free end of the cam lever 70 rotates it comes into contact with the ratchet lever and turns the latter about its pin 82 so that its opposite end is forced in against the ratchet spring 80 to press it toward the gear 75. This pressing of the ratchet spring occurs at about the time the pawl 72 moves the gear and minimizes "jumping" of the gear. The relationship of the cam lever and pawl and sliding sleeve in fully withdrawn position of the sliding sleeve and transfer member is shown in Fig. 12.

When the transfer member 14 and sliding sleeve 15 are moved toward the housing 2 on a succeeding stroke for placing a slide holder in the housing, the pawl spring 85 shown in engagement with the cam lever follower 68 permits the pawl to slide over the adjacent tooth of the gear 75. The ratchet spring holds the gear in position during this return movement of the pawl to the opposite side of the gear. During movement of the sliding sleeve toward the housing, the stud 63 and roller 64 travel along the adjacent curved surface of the cam lever 70, and at the rear of the cam lever follower 68. During this return movement the cam lever 70 is rotated about its mounting pin, in counterclockwise direction and in opposition to the cam lever spring 73, to the position illustrated in Fig. 9. In the relationship of Fig. 9, the stud and roller of the sliding sleeve have moved outwardly to the front of the cam lever follower 68 and are again in position for moving along the cam lever follower to engage the facing surface 69 of the cam lever in order to again turn the gear 75 through another tooth.

The base portion 48 which supports the magazine is preferably cut out so as to receive the cam lever, cam lever follower, cam lever spring, and the upwardly projecting stud and roller of the sliding sleeve. A cover plate 87 may be riveted into position over the indexing or advancing mechanism just described and the sliding sleeve may be guided by a portion of a base plate 88, into which it projects, and which also cooperates with the cover plate 87 in enclosing the operating mechanism.

With the above magazine advancing mechanism, the gear 75 is yieldably held so that the magazine may be moved to and fro along the supporting and guiding means 1, even though the magazine rack 35 engages the gear 75. When the magazine is moved to the left (Fig. 12) the ratchet lever spring 80 yields to permit rotation of the gear 75. When the magazine is moved to the right, the ratchet spring 80 again yields to allow counterclockwise rotation of the gear 75 and movement of the magazine toward right.

The housing 2 is preferably secured in any suitable manner, for example by rivets, to the upwardly extending side wall 49 of the magazine support and guide.

A pair of inter-engaged shutter members or leafs 90, 91 serve to close the aperture 13 of the housing. These shutter members are movable together and apart with respect to each other, being normally urged apart from each other by a spring 92 at the interior of one of the shutter members. The shutters are urged into position to block the aperture 13 of the housing by an additional spring 94 interposed between one end of the housing and one of the shutter members. Inwardly projecting portions 95 of the housing act as stops to limit the extent of movement of the shutter members by the shutter spring 94, which tends to move them over the aperture 13 through the housing.

When a slide holder is inserted into the housing 2 by the transfer member 11, an adjacent edge of the slide holder comes into contact with the shutter member 90 and moves the shutter toward the closed end of the housing and out of registry with the housing aperture 13, in opposition to the effect of the spring 94 and in opposition to the spring 92 contained within the space between the shutter members 90 and 91. As the transfer member and a slide holder are moved back toward the magazine, the shutter springs cause the shutters to follow along behind the slide holder and close the opening 13 through the housing. In this manner bright illumination from the light source contained within a projector is prevented from striking the screen, which tends to momentarily blind a person.

Upper and lower springs 97 are preferably provided in the housing for urging a slide holder against one wall of the housing. In this manner each holder is held in the same position in the housing and the projector does not have to be re-focused to clearly show the slide picture on the screen. The lower spring preferably has a small projection 96 adapted to snap into the recess 27 at the end of transfer member 11, to thereby help hold it and a slide holder in viewing position.

Various shapes and sizes of attachment brackets may be provided to properly support the housing 2 in position on a projector. In Fig. 14 there is indicated in dot-dash lines a bracket that may be used with one projector. Preferably each of the auxiliary attachment brackets has a tab which may extend through an aperture 98 in the housing 2, and may have other tabs to fit over suitable portions of the housing.

The operation of the present slide changing means has been described in connection with the construction of the slide changer and hence repetition of the operation at this point would be superfluous.

It will be seen that the present invention provides a new and improved slide changing means of relatively simple and inexpensive construction and operation. Simple means is provided for engaging and interlocking with a slide holder during transfer of it to and from viewing position. Each slide is protected by an individual holder. Improved means is provided for automatically advancing a magazine in conjunction with movement of a slide transferring means. The magazine is freely adjustable along its supporting and guiding means even though in engagement with the advancing means. The magazine itself is of simple construction and firmly retains slide holders therein by engaging with opposite side portions of them. An improved shutter construction opens and closes an aperture through the slide housing in response to movement of slides in and out of the housing. The relatively simple and rugged construction of the present slide changing means enables it to stand up well under any rough usage to which it may be subjected.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, what I claim is:

1. In a device of the class described for moving a slide frame member toward and away from viewing position, the combination of a generally planar frame member, means for maintaining the frame member is alignment with a transfer member, a transfer member movable toward and away from the viewing position, one of said members having a projection and the other having a recess adapted to receive the projection, and means for moving the transfer member in the plane of the frame member to place the projection in the recess adjacent the beginning of movement of the transfer member toward viewing position and for removing it therefrom adjacent the end of movement away from viewing position.

2. In a device of the class described for moving a slide holder member toward and away from viewing position, the combination of a holder member having a recessed extension adjacent one edge thereof, a transfer member movable toward and away from the viewing position having a projection facing generally toward and adapted to extend into said recess of the extension, and cam means for laterally moving the transfer member toward said extension to place its projection in the recess adjacent the beginning of movement of the transfer member toward viewing position and for moving the transfer member away from the extension to remove the projection from the recess adjacent the end of movement away from viewing position.

3. In a device of the class described having means adapted to movably support a magazine, a slide transfer member reciprocable transversely of the direction of magazine movement, means for maintaining said transfer member in a single plane at all times, and means for raising and lowering the transfer member with respect to said supporting means during a portion of its reciprocation for engagement and disengagement with a single edge of a slide holder.

4. In a device of the class described having support means adapted to movably support a magazine, a slide transfer member reciprocable transversely of the direction of magazine movement, means rotatably supporting said transfer member adjacent one end thereof, a guide member fixedly connected to said support means and extending alongside the transfer member adjacent the supporting means for maintaining said transfer member in a single plane during reciprocation thereof, and means including an inclined surface on one of said members and a fixed projection on the other for raising and lowering the transfer member with respect to said supporting means during a portion of its reciprocation for engagement and disengagement with a single edge of a slide holder.

5. In a device as claimed in claim 4, in which said inclined surface is carried by the transfer member, and said fixed projection is carried by the guide member and extends into the path of movement of said inclined surface.

6. A device as claimed in claim 4, in which said inclined surface comprises part of a slot in the transfer member, and said fixed projection extends into the slot.

7. In a device of the class described, the combination of means to support a magazine, a gear carried by said support means adapted to mesh with a rack on a magazine, a slide transfer member carried by the support means and oscillatable transversely thereof between an inner position in which it extends across the support means and an outer position in which it is substantially clear of the support means, means operatively connecting the transfer member with the gear for rotating the latter a definite increment as the transfer member approaches said outer position to thereby advance a magazine a definite distance along the support means, and in which said connecting means includes a pair of telescoping member movable beneath the support means and one of said telescoping members carries a projection for effecting rotation of the gear.

8. In a device of the class described, means adapted to support a magazine, slide transfer means reciprocable generally transversely of said support means, a gear carried by said support means adapted to mesh with a rack on a magazine, a gear engaging member carried by said support means, and means reciprocable with said transfer means having a portion for moving the gear engaging member to rotate the gear and advance a magazine.

9. In a device of the class described, means adapted to support a magazine, slide transfer means reciprocable generally transversely of said support means, a gear carried by said support means adapted to mesh with a rack on a magazine, a gear engaging member carried by said support means and lying in substantially the same plane as said gear, and means reciprocable with said transfer means having a projection for moving the gear engaging member to rotate the gear and advance a magazine.

10. In a device of the class described having a base member for supporting a slide magazine and a slide housing projecting outwardly from one side of the base member, a slide transfer member carried by the base member at the opposite side thereof from the housing and in alignment with said housing for moving slides between the magazine and the housing, means for raising and lowering said transfer member with respect to the base member for engaging and disengaging one edge of slide holders carried by a magazine, a gear carried by said base member for meshing with a rack on the magazine, and means on said base member operatively connecting the gear with said transfer member for rotating the gear and advancing the rack by movement of the transfer member.

11. In a device of the class described, means for advancing a magazine comprising a base for supporting the slide magazine, a gear carried by the base adapted to mesh with a rack on the magazine, a cam having means thereon for rotating the gear, a slide member movable transversely of the base, and means carried by the slide member for contacting and moving the cam to thereby rotate said gear and advance a rack and the magazine connected therewith.

12. A magazine of the class described having top and bottom members each provided with a plurality of transversely extending inwardly projecting portions forming a plurality of spaces for receiving upper and lower portions of slide holders, and yieldable means in said spaces projecting inwardly intermediate the transversely extending portions of one of said members adapted to contact edge portions of slide holders to retain them in the magazine.

13. A magazine of the class described having top and bottom members each provided with a plurality of transversely extending inwardly projecting portions forming a plurality of spaces for receiving upper and lower portions of a plurality of slide holders, and an additional member extending over the inwardly disposed surface of one of said members having a plurality of transversely extending slots through which said inwardly projecting portions extend, portions of said additional member intermediate the slots projecting inwardly for engaging edges of slide holders to retain them in the magazine.

14. In a device of the class described, the combination of a base with generally upright and horizontal legs adapted to support a magazine, means carried by said horizontal leg and located beneath said magazine for advancing said magazine a step at a time, slide transfer means carried by said horizontal leg and reciprocable transversely thereof, means operatively connecting the transfer means with the advancing means, said connecting means comprising a roller on said transfer means and a cooperating cam on said horizontal leg, said transfer means including a rotatable member and means for rotating said rotatable member toward and away from said horizontal leg.

15. In a device of the class described, the combination of means adapted to support a magazine, a gear carried by said support means adapted to mesh with a rack on a magazine, a slide transfer member carried by the support means and oscillatable transversely thereof between an inner position in which it extends across the support means and an outer position in which it is substantially clear of the support means, and means operatively connecting the transfer member with the gear for rotating the latter, said connecting means including a pair of telescoping members movable beneath the support means and one of said telescoping members carrying a projection for effecting rotation of said gear.

16. In a device of the class described having an apertured slide receiving housing projecting therefrom, shutter means carried by the housing for covering the aperture when no slide is in the housing, yieldable means urging the shutter means into registry with the aperture, means for pushing a slide against said shutter means in opposition to said yieldable means to move the shutter means out of registry with the aperture by movement of a slide along the housing toward the aperture, said shutter means comprising a pair of relatively movable members having overlapping end portions, and yieldable means carried by at least one of the members for urging them to an extended position.

17. The magazine as claimed in claim 12 in which a plurality of slide holders are positioned therein each with its upper portion in one of the spaces adjacent said top member and with its lower portion in a corresponding space adjacent said bottom member.

18. The magazine as claimed in claim 13 in which a plurality of slide holders are positioned therein each with its upper portion in one of the spaces adjacent said top member and with its lower portion in a corresponding space adjacent said bottom member.

References Cited in the file of this patent
UNITED STATES PATENTS

| | | |
|---|---|---|
| 1,590,704 | Semelroth | June 29, 1926 |
| 1,679,928 | Birdsall | Aug. 7, 1928 |
| 2,058,581 | Fegan | Oct. 27, 1936 |
| 2,427,164 | Stechbart | Sept. 9, 1947 |
| 2,460,359 | Page | Feb. 1, 1949 |
| 2,490,058 | Jablon | Dec. 6, 1949 |
| 2,586,179 | Olsen | Feb. 19, 1952 |
| 2,590,492 | Bennett | Mar. 25, 1952 |